US012596745B1

(12) United States Patent

Hendler et al.

(10) Patent No.: US 12,596,745 B1

(45) Date of Patent: *Apr. 7, 2026

(54) SYSTEMS AND METHODS FOR SEARCHING AN IMAGE DATABASE

(71) Applicant: MOBILEYE VISION TECHNOLOGIES LTD., Jerusalem (IL)

(72) Inventors: Abraham Hendler, Tel-Aviv (IL); Yonatan Shemesh, Tel-Aviv (IL); Gal Alkon, Mevaseret Zion (IL); Tomer Hochbaum, Tel-Aviv (IL); Nadav Shaag, Jerusalem (IL); Ofer Moshe Springer, Jerusalem (IL); Ishay Levi, Jerusalem (IL); Yahel Guberman, Jerusalem (IL); Nir Zabari, Jerusalem (IL); Jeremy Atlan, Jerusalem (IL); Paz Lavi Bunis, Jerusalem (IL); Mordechai Ben Zecharia, Jerusalem (IL); Ido Kenan, Tel-Aviv (IL); Noa Schaffer, Hod HaSharon (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/920,163

(22) Filed: Oct. 18, 2024

Related U.S. Application Data

(63) Continuation of application No. 18/222,693, filed on Jul. 17, 2023, now Pat. No. 12,135,742.

(Continued)

(51) Int. Cl.
| | | |
|---|---|---|
| *G06F 16/58* | (2019.01) | |
| *G06F 3/0482* | (2013.01) | |
| *G06F 16/583* | (2019.01) | |

(52) U.S. Cl.
CPC ........ *G06F 16/5854* (2019.01); *G06F 3/0482* (2013.01)

(58) Field of Classification Search
None
See application file for complete search history.

(56) References Cited

U.S. PATENT DOCUMENTS

| | | | | | |
|---|---|---|---|---|---|
| 5,615,324 | A | * | 3/1997 | Kuboyama | ......... G06F 16/5838 345/441 |
| 6,124,864 | A | * | 9/2000 | Madden | .................. G06T 17/00 382/284 |

(Continued)

*Primary Examiner* — Eliyah S. Harper

(74) *Attorney, Agent, or Firm* — FINNEGAN, HENDERSON, FARABOW, GARRETT & DUNNER LLP

(57) ABSTRACT

The present disclosure is directed to searching an image database. A system may include at least one processor comprising circuitry and a memory, wherein the memory includes instructions that, when executed by the circuitry cause the at least one processor to: receive a first user input including one or more scenario descriptors, identify in a database an initial plurality of images based on the first user input and display the initial plurality of images to a user. The processor may be further configured to receive a second user input wherein the second user input identifies at least one of the initial plurality of images. The at least one processor may identify a refined plurality of images in the database based on the one or more scenario descriptors in combination with the second user input and display the refined plurality of images to the user.

29 Claims, 20 Drawing Sheets

<u>100</u>

Related U.S. Application Data

(60) Provisional application No. 63/389,429, filed on Jul. 15, 2022.

(56) References Cited

U.S. PATENT DOCUMENTS

| | | | |
|---|---|---|---|
| 8,352,465 B1 * | 1/2013 | Jing | G06F 16/583 |
| | | | 707/723 |
| 8,438,163 B1 * | 5/2013 | Li | G06F 16/583 |
| | | | 707/706 |
| 10,909,166 B1 * | 2/2021 | Bogazzi | G06F 16/5838 |
| 10,963,939 B1 * | 3/2021 | Zehr | G06Q 30/0603 |
| 11,216,506 B1 * | 1/2022 | Ranzinger | G06F 16/56 |
| 2004/0267740 A1 * | 12/2004 | Liu | G06F 16/5862 |
| 2007/0217676 A1 * | 9/2007 | Grauman | G06V 10/764 |
| | | | 382/190 |
| 2010/0048242 A1 * | 2/2010 | Rhoads | G06V 10/56 |
| | | | 455/556.1 |
| 2015/0170333 A1 * | 6/2015 | Jing | G06F 16/532 |
| | | | 345/660 |
| 2017/0200065 A1 * | 7/2017 | Wang | G06V 10/764 |
| 2017/0235848 A1 * | 8/2017 | Van Dusen | G06Q 10/101 |
| | | | 705/12 |
| 2018/0300897 A1 * | 10/2018 | Woods | G06T 7/74 |
| 2019/0026958 A1 * | 1/2019 | Gausebeck | H04N 13/10 |
| 2019/0243448 A1 * | 8/2019 | Miller | H04N 13/383 |
| 2019/0378621 A1 * | 12/2019 | Ellison | G06F 3/011 |
| 2020/0074653 A1 * | 3/2020 | Duan | G06T 11/60 |
| 2022/0066456 A1 * | 3/2022 | Ebrahimi Afrouzi | |
| | | | G06F 3/04883 |

* cited by examiner

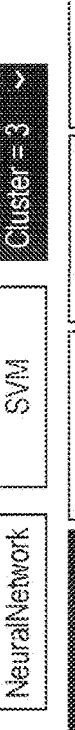
FIG. 8

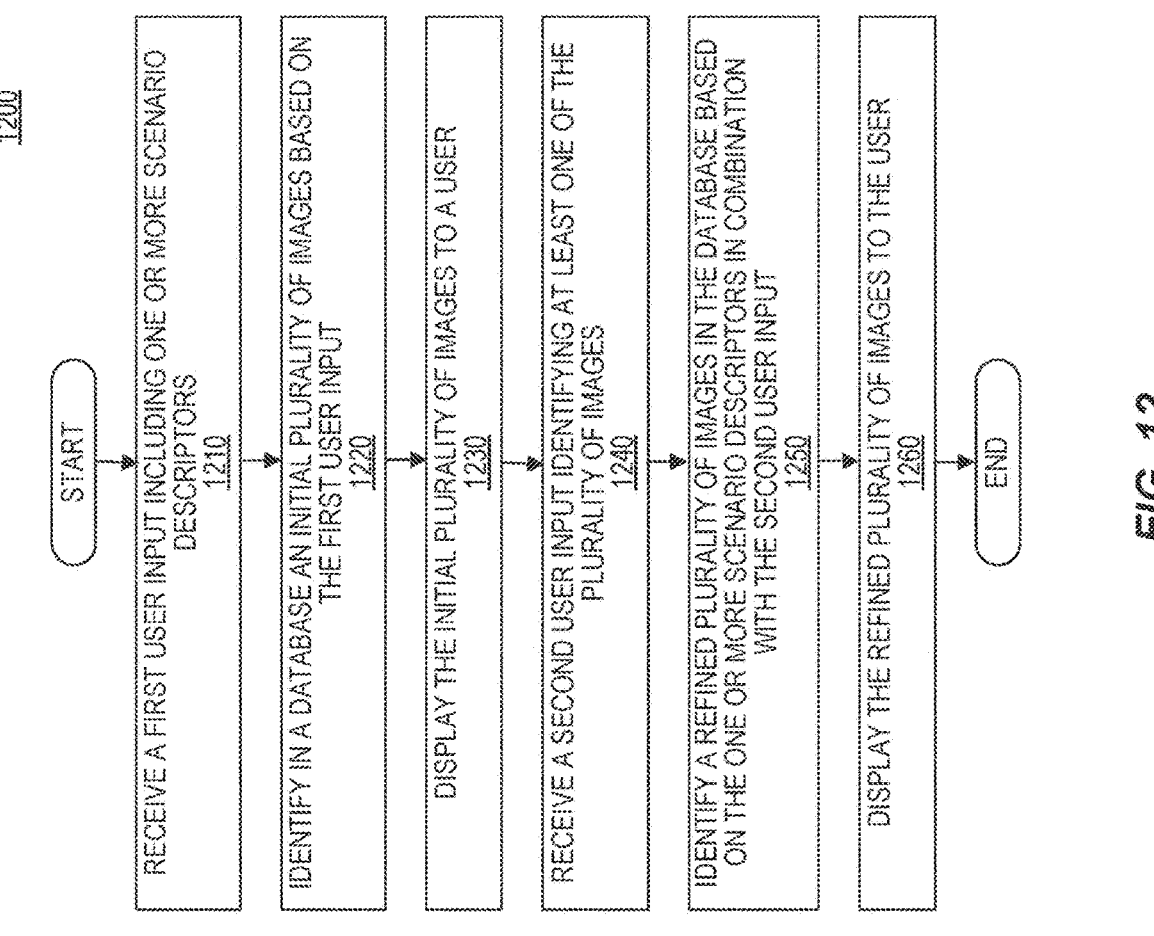

1200

START

RECEIVE A FIRST USER INPUT INCLUDING ONE OR MORE SCENARIO DESCRIPTORS
1210

IDENTIFY IN A DATABASE AN INITIAL PLURALITY OF IMAGES BASED ON THE FIRST USER INPUT
1220

DISPLAY THE INITIAL PLURALITY OF IMAGES TO A USER
1230

RECEIVE A SECOND USER INPUT IDENTIFYING AT LEAST ONE OF THE PLURALITY OF IMAGES
1240

IDENTIFY A REFINED PLURALITY OF IMAGES IN THE DATABASE BASED ON THE ONE OR MORE SCENARIO DESCRIPTORS IN COMBINATION WITH THE SECOND USER INPUT
1250

DISPLAY THE REFINED PLURALITY OF IMAGES TO THE USER
1260

END

FIG. 12

SYSTEMS AND METHODS FOR SEARCHING AN IMAGE DATABASE

CROSS-REFERENCE TO RELATED APPLICATIONS

This application is a continuation of (and claims the benefit of priority under 35 U.S.C. § 120) U.S. application Ser. No. 18/222,693, filed Jul. 17, 2023, currently allowed, which claims the benefit of priority of U.S. Provisional Application No. 63/389,429, filed Jul. 15, 2022. The foregoing application is incorporated herein by reference in its entirety.

TECHNICAL FIELD

The present disclosure generally relates to searching an image database.

BACKGROUND INFORMATION

Artificial intelligence-based systems, including machine learning technology, for example, are quickly becoming ubiquitous across a wide range of industries, from healthcare to autonomous vehicles and virtually everything in between. Most machine learning systems include one or more trained neural networks configured to receive a certain type of input (e.g., a captured image representative of a road environment), make an inference relative to the input (e.g., whether the captured image includes any representations of vehicles with open doors), and generate an output based on the inference (e.g., an indication that the captured image includes a vehicle with an open door, a bounding box around the vehicle with the open door, a bounding box or other indicator identifying the open door, etc.).

How well the trained neural networks perform the desired tasks depends on how the networks were trained. Training of a neural network involves exposing one or more models of the network to a training data set (e.g., a plurality of images representative of various types of vehicles with both open and closed doors). For each image in the training data set, the output of the neural network is monitored. For correct outputs (e.g., properly identifying a representation in a image of a vehicle with an open door), the network is rewarded via a reward function. For incorrect outputs (e.g., misidentifying (or failing to identify) a vehicle with an open door), the network is penalized. In this way, the performance of the trained network may be refined to a level where the trained network can perform a desired task with a high degree of accuracy.

Training of a network, however, relies upon the availability of an appropriate training data set. If the goal is to produce a network having the ability to automatically identify vehicles with open doors, the training data set should include a plurality of images representative of vehicles having both open and closed doors. Further, a data set including only easy cases (e.g., images showing close up vehicles in good lighting with clearly visible open or closed doors) may be less effective for training as compared to more difficult, edge cases (e.g., images showing distant vehicles, partially obscured vehicles, vehicles in poor lighting or poor weather, vehicle doors that are only slightly open, open doors from directly behind a vehicle, etc.). As generating correct outputs in these cases may be more difficult for a network, such examples may make training of the network more efficient and may produce a trained network with more robust performance.

Based on those considerations, a data set for training a network may include many examples (e.g., 100's or 1000's of images or more) and may include a mix of easy to identify features as well as a significant number of varied edge cases that are more difficult for a network to correctly characterize during training. Assembling such data sets, however, can present significant challenges.

In some cases, an image data set may be synthetically generated. For example, various object and characteristics parameters may be provided to a computer-based image generation system, and the system may return a desired number of synthetically generated images representative of a certain subject (e.g., cars with open and closed doors) with a desired degree of variation (e.g., lighting, distances, weather, etc.). Such an approach, however, may require sophisticated object libraries, interfaces, and image generation techniques to provide a degree of realism and variation similar to a selection of images representative of the real world.

In other cases, image data suitable for training a network to perform a desired task may be readily available. In some industries, it may be common to have libraries of millions or billions (or many more) images from which a training data set may be selected. In the autonomous vehicle area, as one example, image harvesting vehicles may navigate road segments and capture images representative of the navigated road segments. Such an approach may scale to millions of vehicles traversing roads across the globe while capturing images at a frame rate of 9 Hz or more. In this example, many, many images representative of road environments under many different conditions and involving many different subjects and scenarios may be captured.

Among such large image libraries, image data suitable for inclusion in a training data set likely exists. The challenge is finding it among the millions or billions of available images. Finding a few hundred edge case image examples among billions of available images may be significantly more difficult than finding a needle in a haystack.

The presently disclosed systems are aimed at facilitating the identification in large image libraries of images for a training data set, among other uses.

SUMMARY

The present disclosure is directed to systems and methods for searching an image database. In an embodiment, the system may include at least one processor comprising circuitry and a memory, wherein the memory includes instructions that, when executed by the circuitry, may cause the at least one processor to receive a first user input including one or more scenario descriptors, identify in a database an initial plurality of images based on the first user input and display the initial plurality of images to a user. The at least one processor may be also configured to receive a second user input wherein the second user input may identify at least one of the initial plurality of images. The at least one processor may identify a refined plurality of images in the database based on the one or more scenario descriptors in combination with the second user input and display the refined plurality of images to the user.

In an embodiment, a method for searching an image database may include receiving a first user input including one or more scenario descriptors; identifying in a database an initial plurality of images based on the first user input; displaying the initial plurality of images to a user; receiving a second user input wherein the second user input identifies at least one of the initial plurality of images; identifying a refined plurality of images in the database based on the one or more scenario descriptors in combination with the second user input; and displaying the refined plurality of images to the user.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 6, 7 and 8 show search results from the search tool with a clustering filter setting selected, consistent with the disclosed embodiments.

FIG. 12 is a flowchart showing an exemplary process for refining search results based on user input, consistent with the disclosed embodiments.

DETAILED DESCRIPTION

Figure 1:
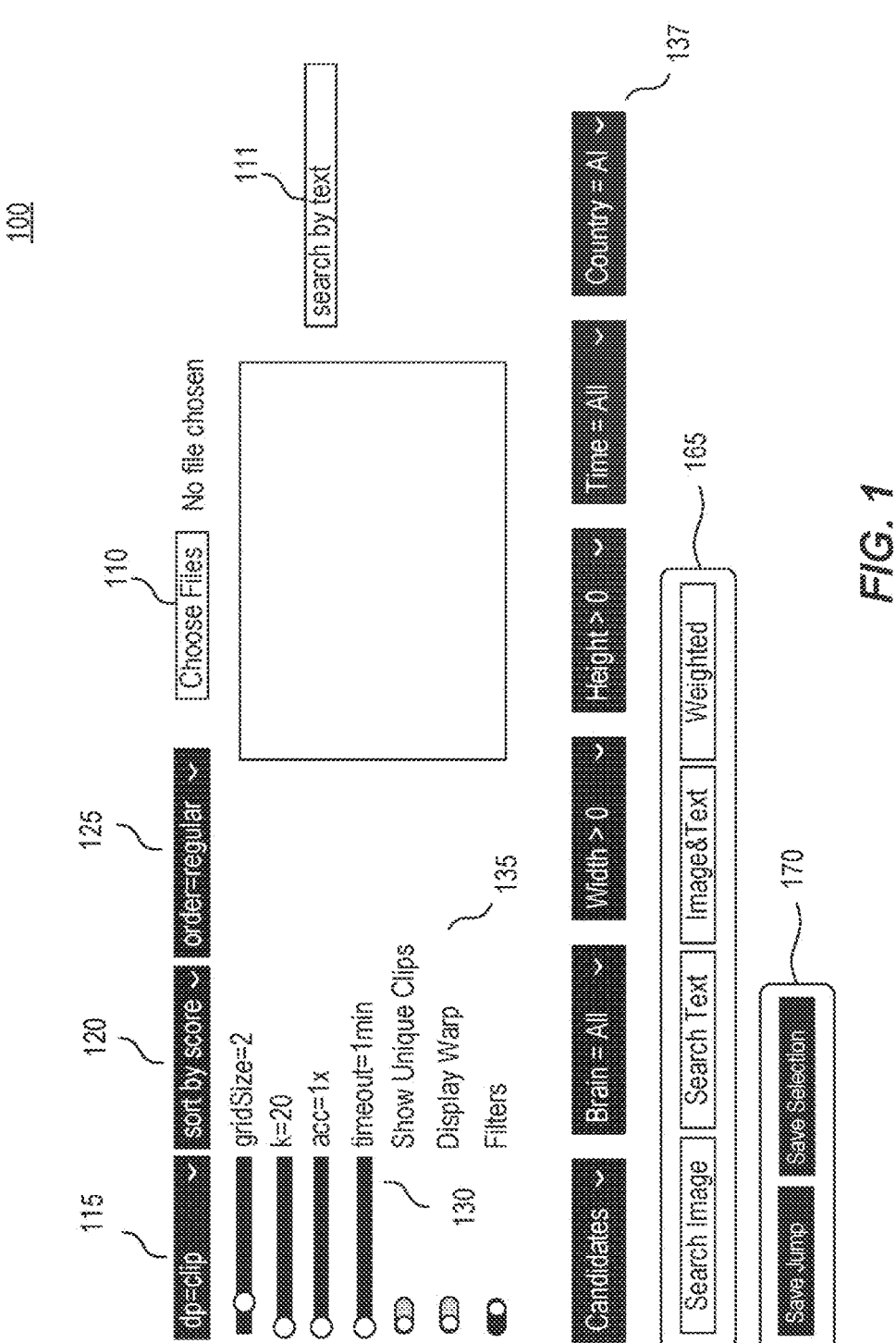
FIG. 1 shows an example home screen of an image search tool, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

As an overview, the disclosed systems may include a user interface for receiving from a user one or more inputs descriptive of images the user would like to identify in an image library. In some cases, the desired images may be intended for inclusion in a training data set for use in training a neural network of a machine learning system. The user inputs may have various forms. In some cases, the user inputs may be provided in text form, where the text conveys one or more scenario descriptors (e.g., vehicle with open door) the user desired to be represented by images identified from the image library. Based on the received input(s), the system searches the image library and returns a set of images determined to at least partially agree with the one or more received scenario descriptors. At this stage, the user can skim through the returned results, and via user interface functionality, may identify at least one of the returned images that represents the type of scenario desired by the user for the data set to be assembled. The user may also identify at least one of the returned images that does not represent the type of scenario desired by the user. Based on the supplemental input provided by the user, the system may identify a refined plurality of images from the image library and display the refined plurality of images to the user. The refined plurality of images may be selected by the disclosed systems based on both the original user input, including the scenario descriptors, as well as the supplemental user input providing guidance for refining the output. This process may also be repeated to continue refining the returned data set until the user is satisfied with the images included in the refined data set. The refined image data set may then be used in the training of neural networks to perform a desired task, among other purposes.

The disclosed embodiments may include a search engine tool providing access to one or more image databases/libraries. The image databases may be stored in a single memory or may be distributed across multiple memory systems (e.g., memories accessible via a LAN, WAN, the Internet, etc.). The search engine tool may further include a user interface including interface elements shown on a display to allow a user to interact with and use the features and functionality offered by the search engine tool.

Various software engine architectures may be used to provide the disclosed search engine functionality. In some cases, the search engine may rely upon an algorithmic approach. In other cases, the search engine may include one or more trained models as part of a machine learning system. In one example, the disclosed search engine may include a CLIP (Contrastive Language-Image Pretraining) model or a CLIP model emulator to identify and return image outputs based on received user input. User input to the CLIP model may be in the form of text or images. Text input to the CLIP model causes the search engine to return images determined to agree with the text input. Vice versa, one or more images may be input to the CLIP model, and in response, the search engine may return other images similar in one or more respects to the images provided as input. Textual outputs may also be generated based on images received as input to the CLIP model.

CLIP stands for Contrastive Language-Imaging Pretraining. CLIP is an open source, multi-modal, zero-shot model. Given a particular image and/or text descriptions, the model can predict the most relevant text description for the particular image or the most relevant image(s) to match the provided text descriptions. This functionality can be provided without optimizing for a particular task. CLIP combines natural language processing with computer vision techniques. It is considered to be a zero shot model, which refers to a type of learning involving generalizing on unseen labels, without having been specifically trained to classify the labels. Using a contrastive language technique, CLIP is trained to infer that similar representations should be close in latent space, while dissimilar representations should be farther apart. CLIP is trained using more than 400 million image-text pairs and can accurately recognize classes and objects that it has never encountered before. Among other capabilities, a CLIP model can label images in a large image dataset according to classes, categories, descriptions, etc.

Training of CLIP involves a contrastive pre-training process. For a batch of N images paired with their respective descriptions (e.g. <image1, text1>, <image2, text2>, <imageN, textN>), contrastive pre-training aims to jointly train an Image Encoder and a Text Encoder that produce image embeddings [I1, I2 . . . IN] and text embeddings [T1, T2 . . . TN], such that the cosine similarities of the correct <image-text> embedding pairs <I1,T1>, <I2,T2> (where i=j) are maximized. In a contrastive fashion, the cosine similarities of dissimilar pairs <I1,T2>, <I1,T3> . . . <Ii,Tj> (where i≠j) are minimized. Particularly, after receiving a batch of N <image-text> pairs, for every image in the batch, the Image Encoder computes an image vector. The first image corresponds to the I1 vector, the second to I2, and so on. Each vector is of size de, where de is the size of the latent dimension. Hence, the output of this step is N×de matrix. Similarly, the textual descriptions are used to generate into text embeddings [T1, T2 . . . TN], producing a N×de matrix. These matrices are multiplied to calculate the pairwise cosine similarities between every image and text description. This produces an N×N matrix. The goal is to maximize the cosine similarity along the diagonal—these are the correct <image-text> pairs. In a contrastive fashion, off-diagonal elements should have their similarities minimized.

The CLIP model uses a symmetric cross-entropy loss as its optimization objective. This type of loss minimizes both the image-to-text direction as well as the text-to-image direction. Note that the contrastive loss matrix keeps both the <I1,T2> and <I2,T1> cosine similarities.

Zero shot classification may follow pre-training of the image and text encoders. A set of text descriptions such as a "photo of a dog" or a "photo of a cat eating an ice-cream" that describe one or more images are encoded into text embeddings. Next, a similar process is repeated for images and the images are encoded into image embeddings. Lastly, CLIP computes the pairwise cosine similarities between the image and the text embeddings, and the text prompt with the highest similarity is chosen as the prediction.

CLIP can understand multiple entities along with their actions in each image. Further, CLIP assigns to each image a description with a degree of specificity that agrees with the image. For instance, a particular image (e.g., one representing a dog on a beach) may be described as 'a dog' and 'a dog at the beach'. Another image showing a close-up of a dog may be described as 'a dog,' but will not also be described as 'a dog at the beach,' if there is no beach represented in the image.

FIG. 1 shows an example user interface 100 that may be used to interact with the disclosed search engine tool. For example, to initiate a search of an image database, a user can enter a text string via text box 111 or may identify one or more sample images via a file selector button 110. The text string may include a single word (e.g., "car"). More complex text strings may also be entered to initiate a search of an image database. For example, a text string conveying one or more scenario descriptors may also be input via text box 111. Such scenario descriptors may include any details, adjectives, modifiers, objects of interaction, setting information, etc. included in a text input (or image input) provided by a user that relate to a particular subject identified in the text input (or image input) provided to the system by the user. Just a few examples among many possibilities may include:

- a car (subject) with an open door (in this example, the specification of the open door indicates a detail relating to the car that provides setting information; further, e.g., the open door describes the state of the car and indicates how the car and door interact);
- a car with a closed door;
- a vehicle parked along a road edge;
- a line of parked vehicles;
- a car partially obscured by an object;
- a truck carrying a vehicle;
- cars with bike racks;
- cars in shadows;
- potholes in an urban environment;
- painted speed bumps;
- zebra crossings with waiting pedestrians; etc.

By selecting the file selector button 110, a user may identify one or more sample images to be used by the search engine as guides for the image search. By way of an example, a user may "browse" for an image stored on a local computer or network drive to select an image file to initiate a search. Once selected, the image may appear in an image search box. Additionally, a user may use "control+v" to paste a copied image into the image search box. Using the CLIP model functionality, the search engine may generate one or more text descriptors for each of the selected sample images and use the generated text descriptors to initiate the image search. In other cases, the search engine may proceed by searching for images that are close in latent space to the identified sample images.

Figure 2:
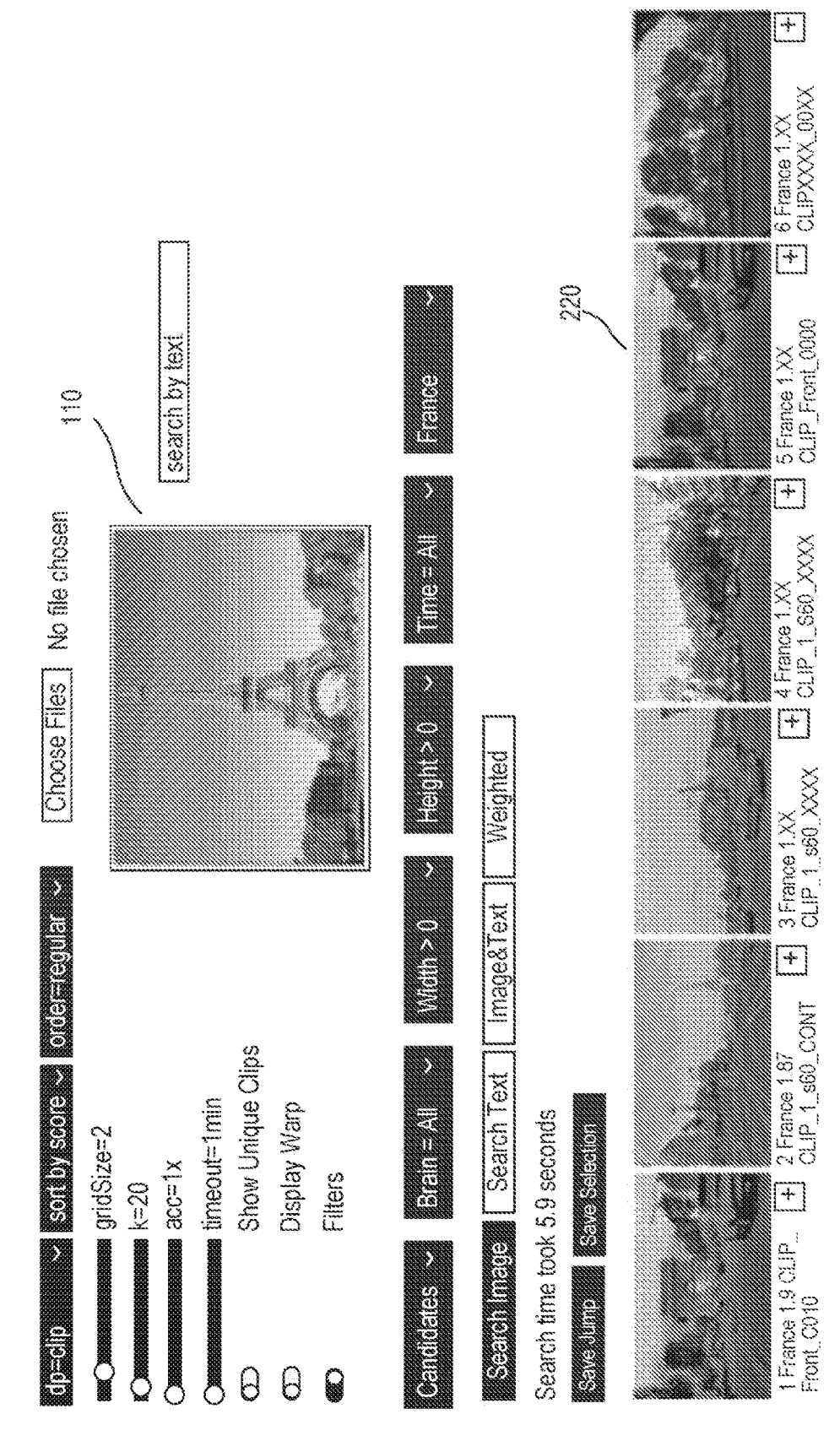
FIG. 2 represents an example search using the search tool, consistent with the disclosed embodiments.

FIG. 2 shows an illustrative example of user interface 100 during an initiated search of an image database. In this example, the user has selected a sample image file including a representation of the Eiffel Tower. A thumbnail preview of the selected sample image may be shown in an image search box 110. Based on an automatically generated text descriptor (e.g., using the CLIP model functionality) corresponding to the sample image, or based on a latent space comparison between the sample image and images stored in a database, the search engine tool may identify and retrieve images from the database determined to be similar to the sample image.

An initial set of search results 220 may be shown to the user. Any suitable technique may be used for providing the search results to a display screen. The search results may be grouped at the bottom of the user interface, as shown in FIG. 2. Depending on the number of returned search results (e.g., a parameter that is selectable by the user), a scroll bar or a page advance interface element may be provided to enable a user to scroll through or otherwise navigate through a large group of returned search results. Based on the sample image, which features a representation of the Eiffel Tower, the search engine tool has returned a plurality of images including various scenes associated with Paris. Some of the search results include images featuring the Arc de Triomphe, while others include representations of the Eiffel Tower, but from different vantage points relative to the sample image.

Figure 3:
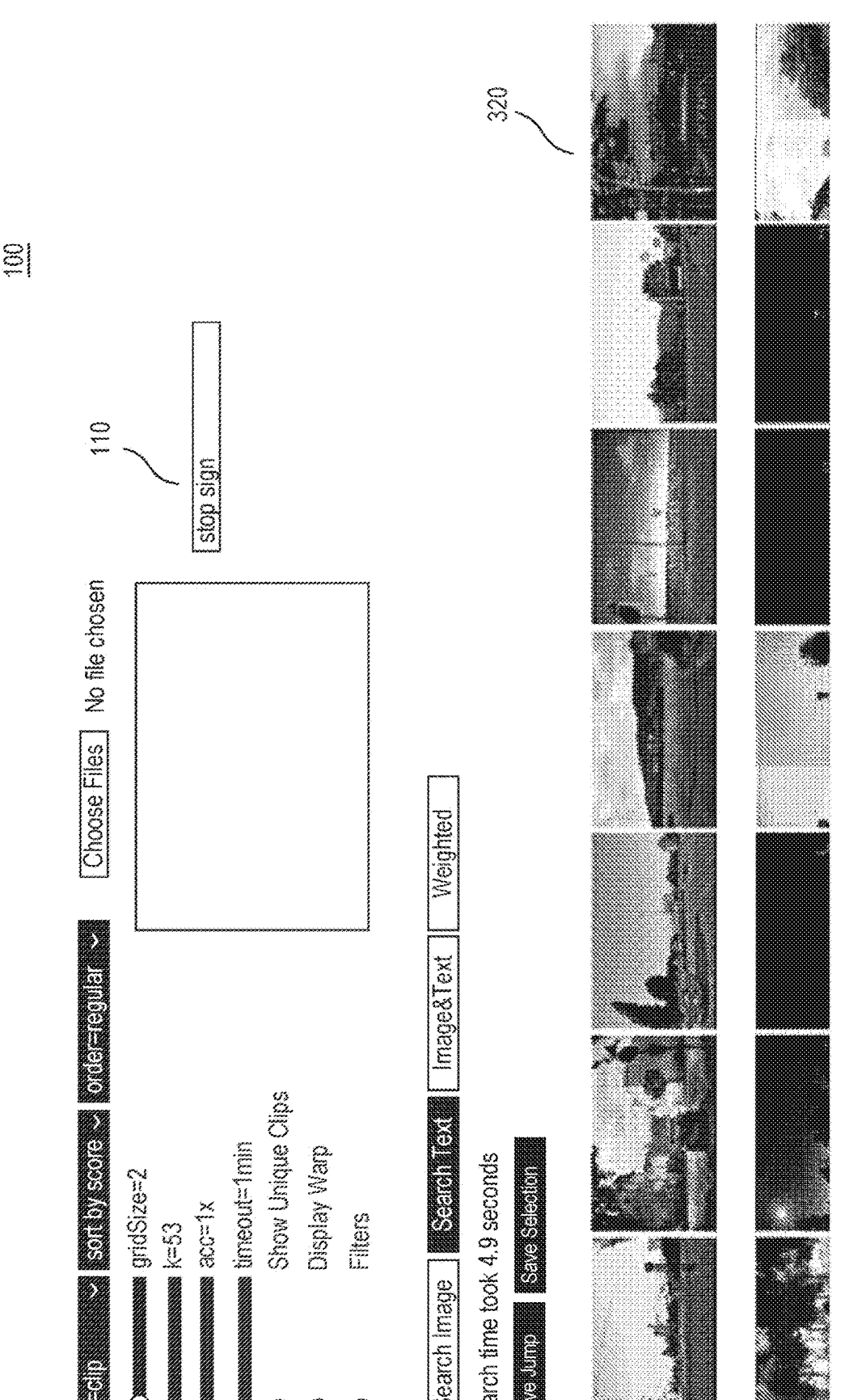
FIG. 3 shows an example of a text-based search using the search tool, consistent with the disclosed embodiments.

FIG. 3 shows an illustrative example of user interface 100 during an image search initiated by entry of a text string in text box 110. In this example, the user has entered the string "stop sign." Based on this text descriptor and the functionality of the CLIP model described above, the search engine tool may access an image database to identify and retrieve one or more images that include representations of a stop sign or that otherwise relate to the concept of a stop sign. The retrieved search results may be shown at the bottom of the user interface 100, as shown in FIG. 3. In this example, a plurality of images 320 including representations of stop signs at varying distances, orientations, etc. are returned as a result of the initial image database search.

In some cases, the search engine tool (e.g., via the CLIP model functionality or similar image identification techniques) may be used to generate refined search results based on supplemental input received from the user. For example, returning to the example of FIG. 2, by selecting a sample image showing the Eiffel Tower, the user may have been primarily interested in search results including additional images of the Eiffel Tower. Thus, while images 1 and 5 include representations of the Arc de Triomphe, another landmark located in Paris and therefore, potentially related/relevant to the subject of the selected sample image, the user may be less interested in images of the Arc de Triomphe. On the other hand, as images 2 and 6 include varied representations of the Eiffel Tower, the user may be interested in obtaining a refined set of search results that excludes images of the Arc de Triomphe (or other Paris landmarks), but includes more images that include at least a partial representation of the Eiffel Tower.

Various techniques may be used for receiving supplemental input from the user to assist in refining an initial set of image search results. For example, a user may use a pointer (e.g., a mouse) to "click" on images included in search results 220 to select (or de-select) a particular image to be used as a guide in identifying and providing a refined set of search results. In other examples, other types of user interface elements may be provided for enabling a user to identify images in a set of search results that should be used to guide the generation of a refined set of search results. For example, as shown in FIG. 2, each image provided in a set of search results may be associated with a virtual button, such as the square buttons with the "+" symbols. A user may click on any of the virtual buttons in order to select a particular image as a guide for generating a refined set of search results. Clicking on a particular+button may cause a color or shading associated with the selected button to change to indicate to the user that the selection has been received and confirmed.

Based on the user's selections from among a set of search results, the search engine tool proceeds to conduct a new search of the available image database(s) to identify and retrieve images similar to the images designated by the user's selections. This process may be effective in allowing a user to continue to refine a set of search results. This can be especially useful where a user's selected sample image (or input text string) may be associated with multiple valid search paths, not all of which are of interest to the user. For example, based on the sample image selected in the search represented in FIG. 2, the search engine may validly search for images that include: representations of the Eiffel Tower; representations of landmarks in Paris; scenes in Paris; monuments in parks; etc. Thus, an initial set of search results may include images representative of any or all of these subjects. If the user is interested only in images including various different representations of the Eiffel Tower, this interest may be efficiently conveyed by selecting images from the search results that include representations of the Eiffel Tower and not selecting images that show more general scenes of Paris or other landmarks in Paris. Based on the user's selections, the next set of refined image search results will likely include a much higher percentage of images including representations of the Eiffel Tower.

The user may continue to refine the search results using this technique. For example, if the user is interested in images showing the Eiffel Tower only in daylight, the user can select images from a refined set of search results that show the Eiffel Tower during the day and may leave unselected (or may de-select) images from the refined search results that depict the Eiffel Tower (or any other subject) at night.

User interface 100 may include various other interface control elements for allowing a user to customize the image search and, therefore, the image search results produced by the search engine tool. Returning to FIG. 1, a database selector 115 may be included in user interface 100 to enable designation of one or more available databases based on which the image search should be performed. It should be noted that the databases to be searched may include image files, but may also include other types of media, such as video files. Video files may be identified and retrieved in search results based, e.g., on subject matter represented in one or more frames of the video files.

Sorting options may be selected using the sort selector 120 pulldown menu. Search results may be sorted by score, width, and/or height, etc. (e.g., from low to high, high to low, etc.). By way of an example, each search result may be given a "score" based on the relevancy or the search tool estimated accuracy of that search result. The search results may be sorted such that images with the highest scores are shown on the top, left (or right) side of the search results, or the search results may be ordered from low to high relevancy. For example, a sort order interface element 125 may be used to further convey a desired search result order (e.g., "regular" may place images with higher relevancy scores at the top of the results, while "reversed" may place images with higher relevancy scores at the bottom or to the right within the displayed search results).

Interface 100 may also include one or more control sliders 130 to control aspects of the search. For example, control sliders 130 may include a grid side slider (e.g., gridSize=2) to control the display size of the images within the displayed search results. A smaller grid size selection may result in smaller image thumbnails, which may allow for more images to fit within a particular region of a display screen. The control sliders 130 may also include a selector to vary the number of search results to return. For example, a selection of "k=20" may return 20 image search results. An accuracy control slider (e.g., shown with a value of "acc=1×") may allow a user to designate the accuracy of the desired search results, at the expense of additional search time. A timeout slider (e.g., shown with a selection of "timeout=1 min") provides a setting for the maximum allowed time in which to complete the search.

Other control elements 135 may be included to enable or disable (in this example) various features associated with the search engine tool. For example, a show unique clips toggle may allow a user to designate that only unique search results are to be shown. A display warp toggle, when enabled, may cause the search results to include image sub-segments, rather than entire images. This may be especially helpful for allowing a user to more clearly see a segment of an image that resulted in selection of the image for inclusion in the search results. Such review may be difficult where a relevant object is shown only in a small region of an image. Selecting the display warp toggle may allow for a more prominent display of the relevant object within a larger image (e.g., by showing (or highlighting with a bounding box, for example) a sub-segment of a larger image).

A "Filters" switch toggle included in control elements 135 may allow for various filters, such as filters 137, to be applied in selecting the image search results. Among other potential filter types, a user may specify a minimum height and/or width for returned candidates. For example, a user may seek candidates for a training task that are at least X pixels wide by Y pixels high. Such dimensions may be important for ensuring that certain subjects of interest include at least a desired image size (e.g., occupy a desired number of pixels within a 2D image). A time filter may also be applied, for example, such that returned images satisfy a selected time filter (e.g., all times (as shown), within the last year, within the last month, etc.). The filters may also include a location selector. In the example of FIG. 1, a "Country" filter is provided to enable a user to limit the retrieved search results to country locations that satisfy the selected filter (e.g., all countries (as shown), United States, Germany, Israel, etc.). The list of filter examples provided here is not an exhaustive list, and many other filters can be added to or substituted for the filters described herein. Further, dedicated interface objects (e.g., a virtual button on a display screen, etc.) can be provided for each available filter type.

Figure 4:
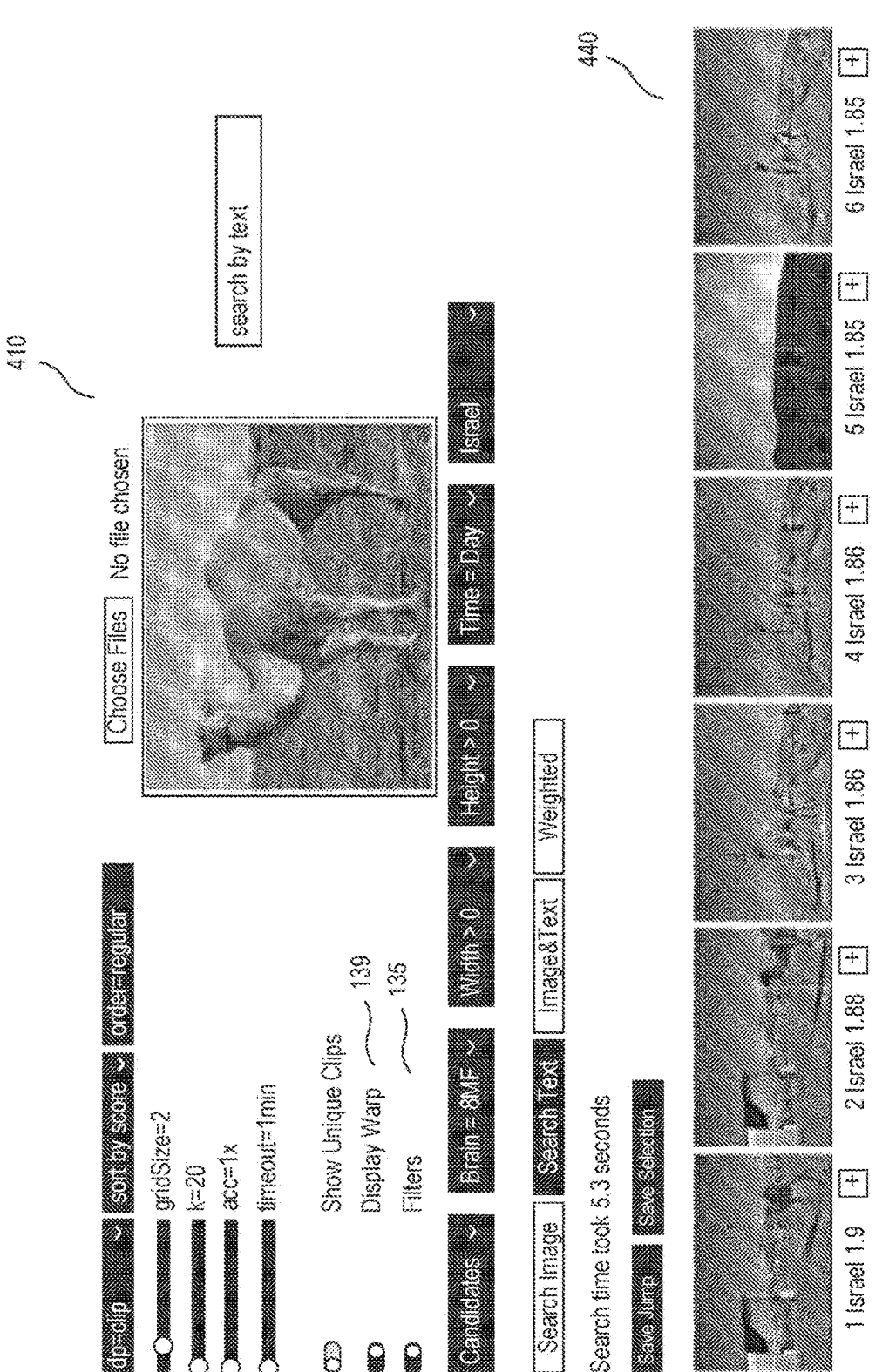
FIG. 4 shows an example of an image-based search with filtering parameters set using the search tool, consistent with the disclosed embodiments.

FIG. 4 provides an example image search based on a selected sample image 410 including a representation of a camel. The image search is also set to use Filters 135 (i.e., Filters is enabled) to return candidate images relevant to the selected sample image that also comply with selected filters, such as an image resolution of at least 8MP, images of any width and height, images captured during daylight, and images captured in Israel. In response to the selected sample image and the specified filter values, the search engine tool returns a plurality of images 440 all captured during the daytime in Israel and all including a representation of a camel. Notably, in the example search represented by FIG. 4, the Display Warp toggle 139 has been enabled, and in response, bounding boxes are provided around camels represented in the image results to highlight the subject and/or region of the retrieved image that the system deems most relevant to the selected sample image.

Returning to FIG. 1, additional search options may be selected by clicking on interface elements 165. In the example, the search options may include, but are not limited to, search image, search text, search image & text and weighted search. Save options may also be selected by clicking on button 170 to select an option for how or whether to store the search results. Save jump may cause the currently displayed results to be saved. Save selection may allow a user to save one or more selected images among the displayed images (e.g., designated by clicking on images to select).

Figure 5:
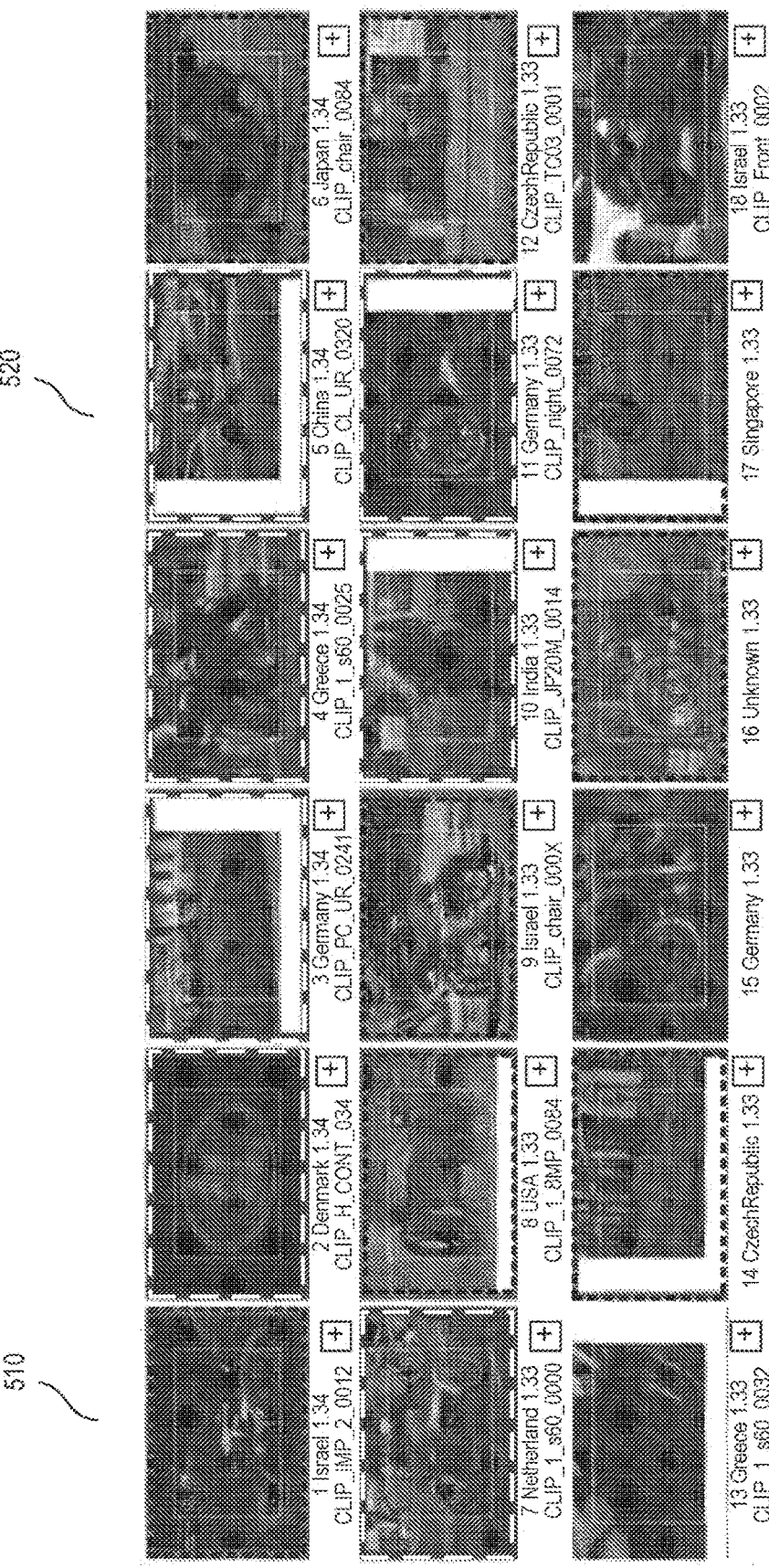
FIG. 5 illustrates an image selection window of a weighted search after selections have been made, consistent with the disclosed embodiments.

Of the different types of searches available, a user may select a weighted search. In a weighted search, after a search query, the user may select designate relevant and/or irrelevant search results by clicking on one or more images in the search results. After clicking on the weighted button, a new query may be initiated taking into consideration the user choices in a subsequent search. By way of an example, FIG. 5 shows the selection of search results for a weighted search on the query "a man on a wheelchair". Image 510 shows a selection by a user that represents a relevant result. Image 510 may be highlighted to the user (e.g., with a green box) to denote a representative relevant result. Image 520 shows a selection by a user that represents an irrelevant result. In image 520, the image shows a man on a chair, not on a wheelchair. Image 520 may be highlighted to the user (e.g., by a red box) to denote a representative irrelevant result. After the selections, the user may click on the weighted button and initiate a subsequent search query that may return refined results based on this additional user input. That is, in this example, the system allows a user to highlight image types to emphasize (weight) in the refined results and image types to de-emphasize (de-weight) in the refined results. This approach may allow a user to even more quickly and efficiently hone in on the subject matter and scenarios of most interest in the search results.

Figure 6:
Figure 7:
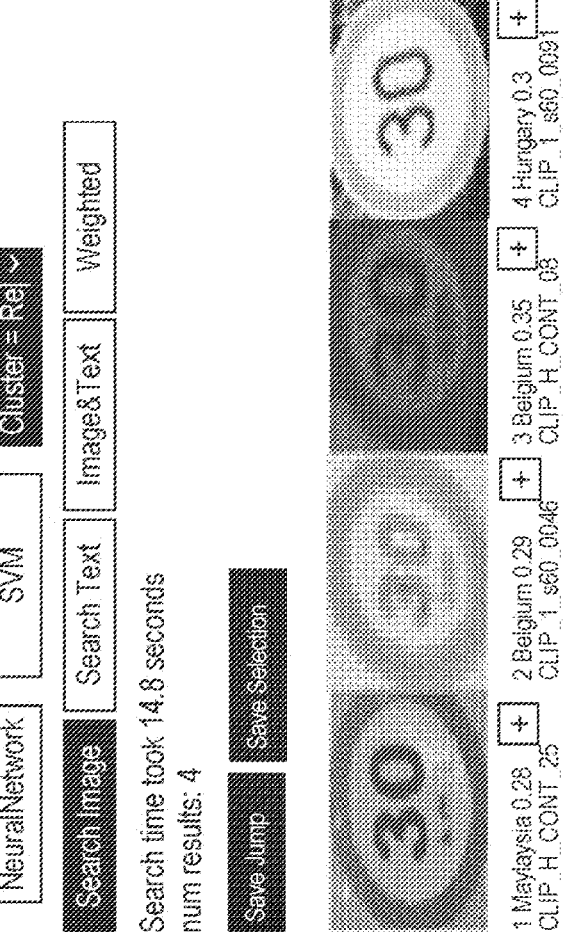

The disclosed search engine may also allow for selection of various machine learning options. For example, different machine learning options/model types, etc. may be available to a user. FIG. 6 shows a traffic sign submitted for a search query. FIGS. 7 and 8 show machine learning options that may be available for application/use in performing a search. In this example, the machine learning options may include NeuralNetwork, SVM, and Cluster options. NeuralNetwork and SVM (i.e., Support Vector Machine Algorithm) may, based on selected relevant results and selected irrelevant results, query a database based on the results and the additional user selections then re-score the samples using the NeuralNetwork algorithm or using the SVM algorithm, etc. A user may continue the training process based on the results. For example, additional user selections to refine subsequent results and the algorithm selected may be used to further refine the subsequent results. For the Cluster option, the search engine may divide query results into a specified number of result clusters (e.g., 4). The Cluster option may allow a user the option to display one or more search results from each cluster thus providing the user an option to choose the cluster that may be a better match (e.g., a relevant cluster) to the search query. As depicted in FIG. 7, an image representative of each of four clusters is shown. A user selection of Cluster=3 in FIG. 7 may cause the system to display the search results associated with Cluster 3.

Figure 9:
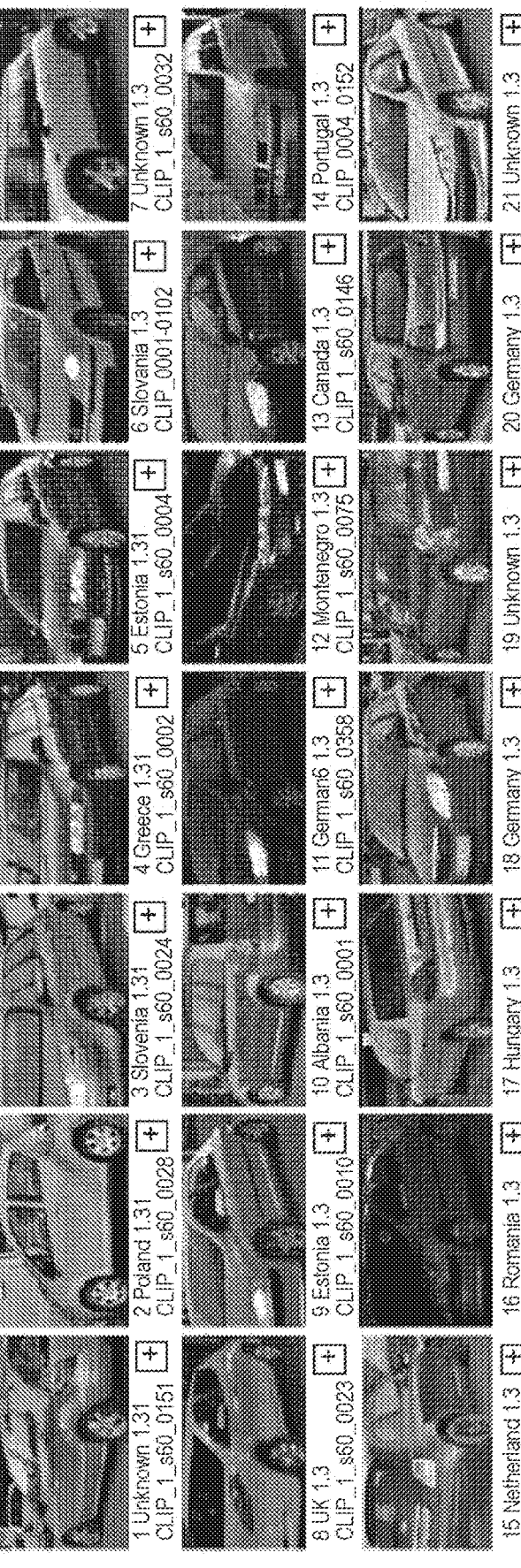
FIGS. 9 and 10 show an example search result of the anomaly database in the search tool, consistent with the disclosed embodiments.
Figure 10:
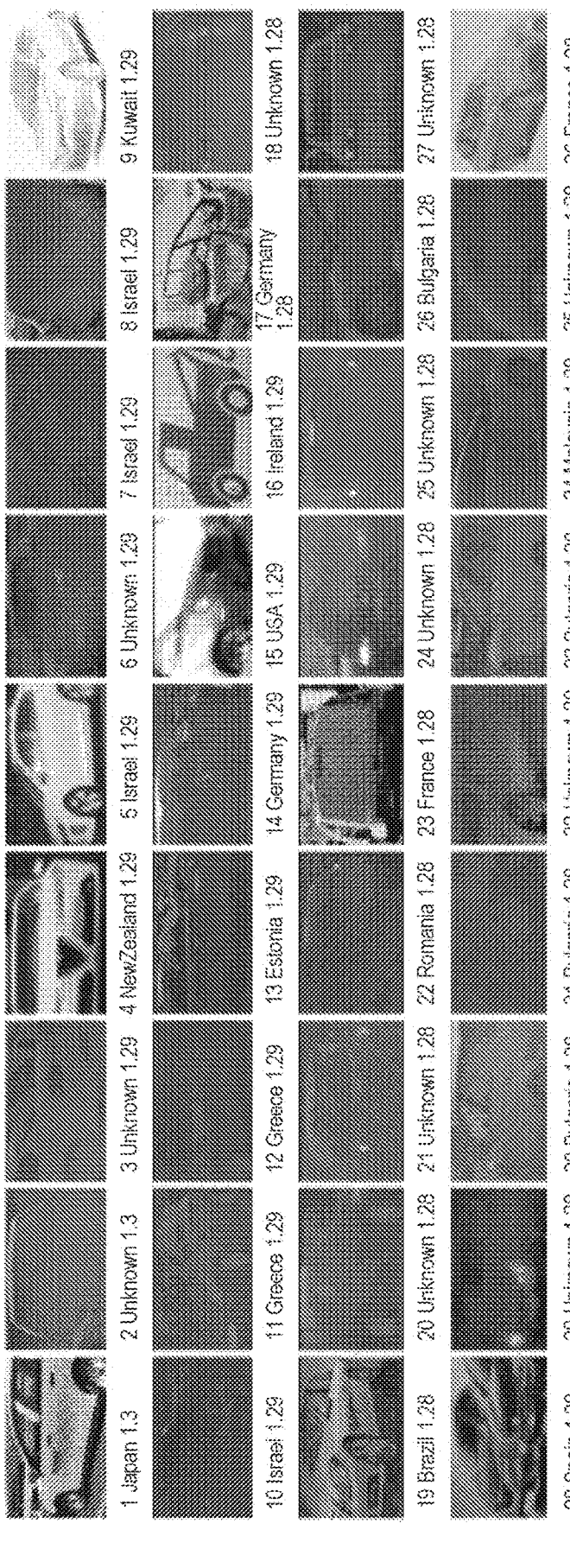

The disclosed search engine may also allow a user to select an anomaly sorter, e.g., via the database pulldown menu. This feature may allow a user to initiate "hard samples mining" (e.g., searches for candidate images that may represent edge cases or that may otherwise be more challenging to classify in an image analysis process). These hard samples, as noted above, may help expedite model training and can result in more robust operation of a trained model. In one example, results from an anomaly sorter may allow a user to sort returned search results based on a score of the search results. The sorted search results may allow a user to understand the distance the search results may be from the domain of search results returned using other databases (i.e., databases other than the anomaly sorter). FIG. 9 shows a search result image set returned in response to a user query of "car". FIG. 10 shows the search results for a query of "car" in the anomaly sorter database. The data set in FIG. 9 is quite uniform and provides example images that are likely easily classified by a trained model as including a "car." On the other hand, the images of FIG. 10 represent edge cases that may be more challenging for a trained model to properly classify. The dataset shown in the FIG. 10 example includes warped/stretched images, blurry images, shaded images, night images, crashed vehicles, cartoon drawings, etc.-all of which may be challenging for a trained model to properly classify as including representations of a "car." Further refinement may be made from an NeuralNetwork search, an SVM search or a weighted search. For example, selecting NeuralNetwork in response to the search of the anomaly database may return search results including a set of blurry images of cars which may then be used as hard samples for further training of computer vision technology.

Figure 11:
FIG. 11 depicts an incorrect search result for windshield wipers, consistent with the disclosed embodiments.

By way of an illustrative example of a search performed via the disclosed search engine, a user may submit to the search engine tool a search for the search term "wipers." The search engine tool may return search results of a plurality of images that are displayed to the user that were retrieved based on the search term. A first portion of the retrieved images may include representations of windshield wipers. However, a second portion of the retrieved images may include representations that do not include windshield wipers. In the second portion, the retrieved images may include representations of other objects (e.g., a tree branch, a telephone pole, a signpost, etc.) that were misclassified as wipers due to, for example, having one or more characteristics corresponding to or shared by characteristics of wipers (e.g., telephone pole in the distance may have a shape characteristic of a windshield wiper). FIG. 11 shows an example in which an image of a street lamp may have been misclassified as a "wiper" due to its shape and may be displayed to a user in response to the search query for "wipers". In response to such search results, the user may provide one or more inputs (e.g., via an input device, a touch screen, a spoken command, etc.) to identify or otherwise select a first portion of the images that may include representations of wipers, and one or more inputs (e.g., via an input device, a touch screen, a spoken command, etc.) that may identify or otherwise may select a portion of the images that may not include representations of windshield wipers. After providing these inputs, the search engine may update the search to provide a refined set of images that include representations of wipers, while excluding images that lack representations of wipers (but may include branches, light posts, or other elongated objects).

FIG. 12 depicts an example search tool process flow 1200 consistent with this disclosure for the use of a system for searching an image database and refining the search results based on user input then displaying the refined results to the user. It is to be appreciated that the search tool process flow 1200 may be implemented by features provided by the search engine tool described herein. The system may comprise at least one processor comprising circuitry and a memory, wherein the memory includes instructions that when executed by the circuitry cause the at least one processor to, as shown in step 1210, receive a first user input that may include one or more scenario descriptors.

In some embodiments, the one or more scenario descriptors may include one or more text strings. In some embodiments, the one or more scenario descriptions may include one or more images or video clips. The one or more images or video clips may be entered as a file. For example, a jpeg file may be provided to the search tool to initiate a search. In another example, a mpeg file may be provided to the search tool to initiate a search. It is to be appreciated that any image or video file format may be used with the disclosed subject matter mentioned herein.

Figure 13:
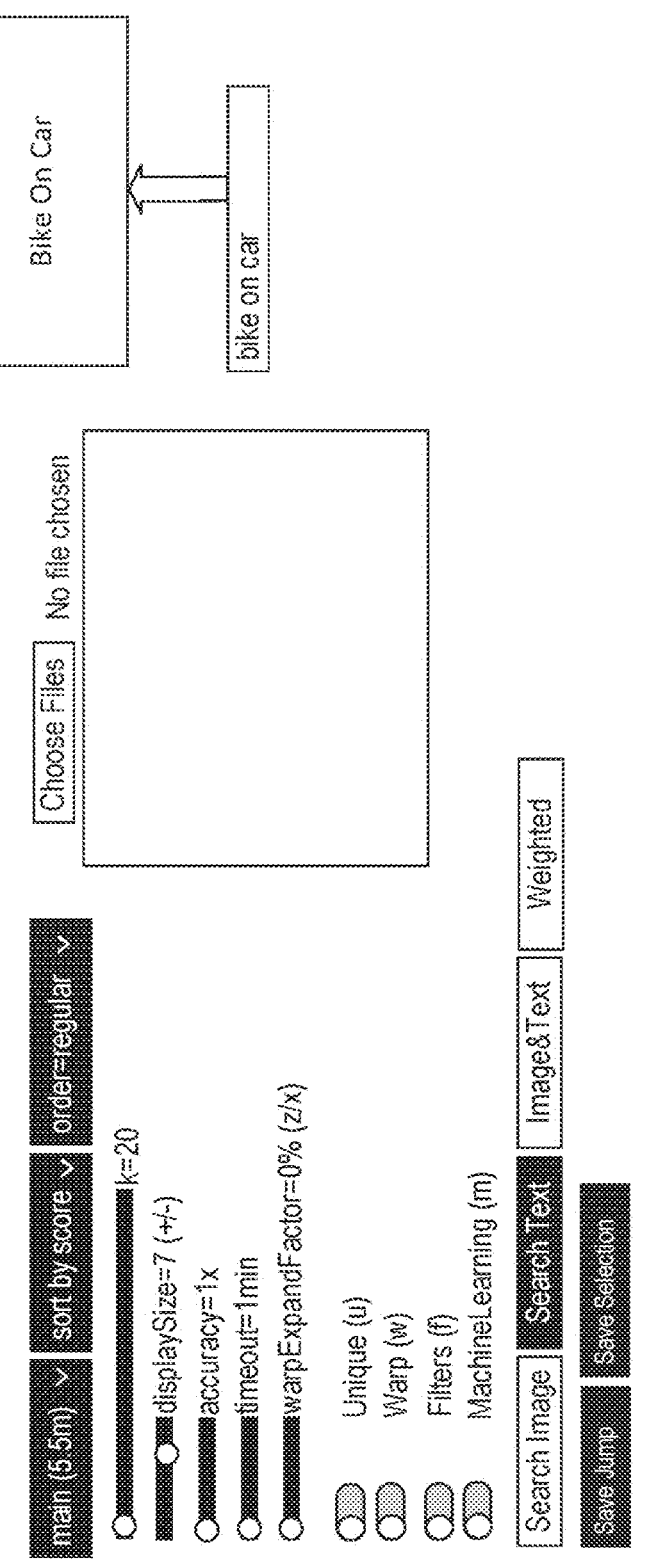
FIGS. 13 and 14 show an example search and corresponding result for two objects with a relationship between the objects, consistent with the disclosed embodiments.
Figure 14:

In some embodiments, the one or more scenario descriptors may convey a relationship between two or more objects. The one or more scenario descriptors may be a text string that may be indicative of a relationship between the two or more objects that may define one or more interactions between the objects. The two or more objects may be associated with each other by position or associated with each other in a way to perform an operation or task together. By way of an example, FIG. 13 shows a text-based search query in ME-Search for "bike on car". In this example, there are two objects, bike and car, and the relationship conveyed between the two objects is that the bike may be located "on" the car (e.g., a scenario descriptor). FIG. 14 shows a plurality of search results for the search query "bike on car". The search results in FIG. 14 show a plurality of results including one or more bikes mounted on the back of a car. It is to be appreciated that images depicting other interpretations of "bike on car" may appear in the search results.

Figure 15:
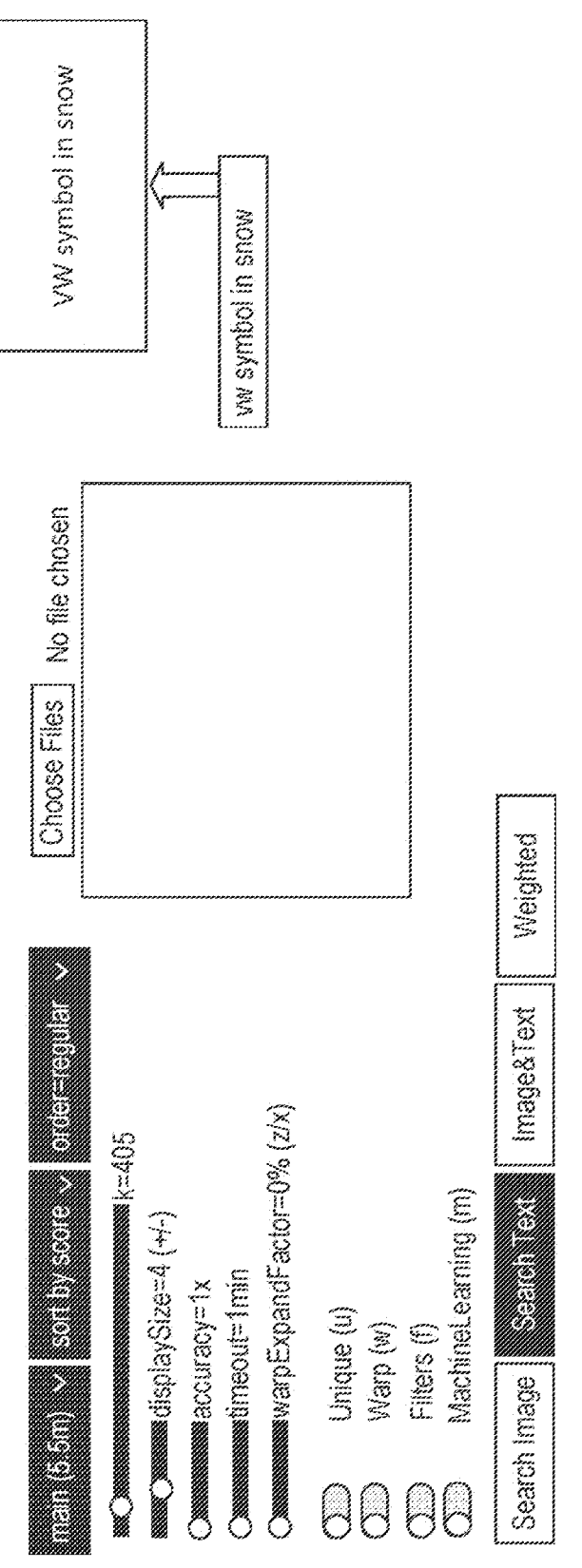
FIGS. 15, 16, 17, 18, 19, and 20 represent three examples of searches and corresponding results for two objects with a relationship between the objects, consistent with the disclosed embodiments.
Figure 16:
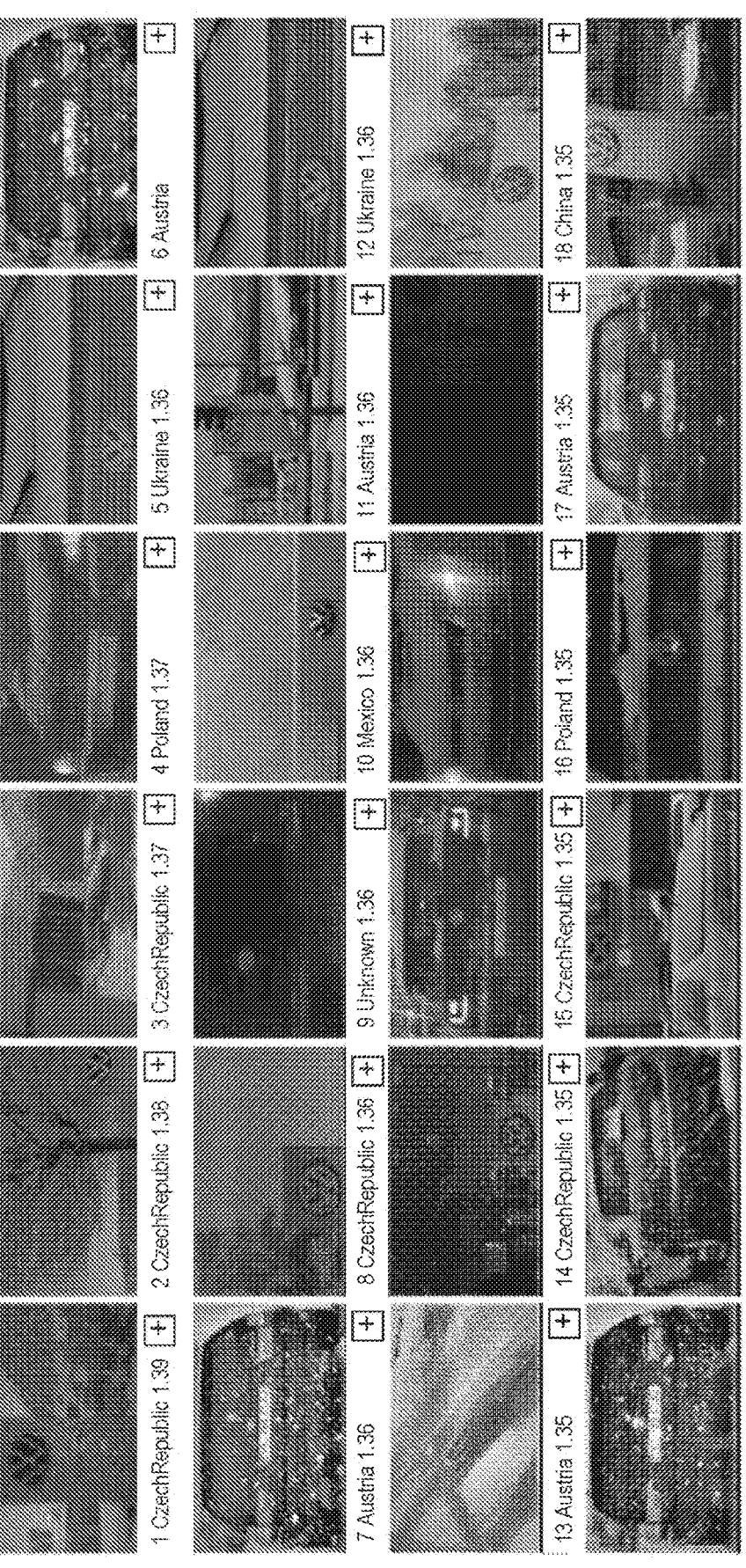
Figure 17:
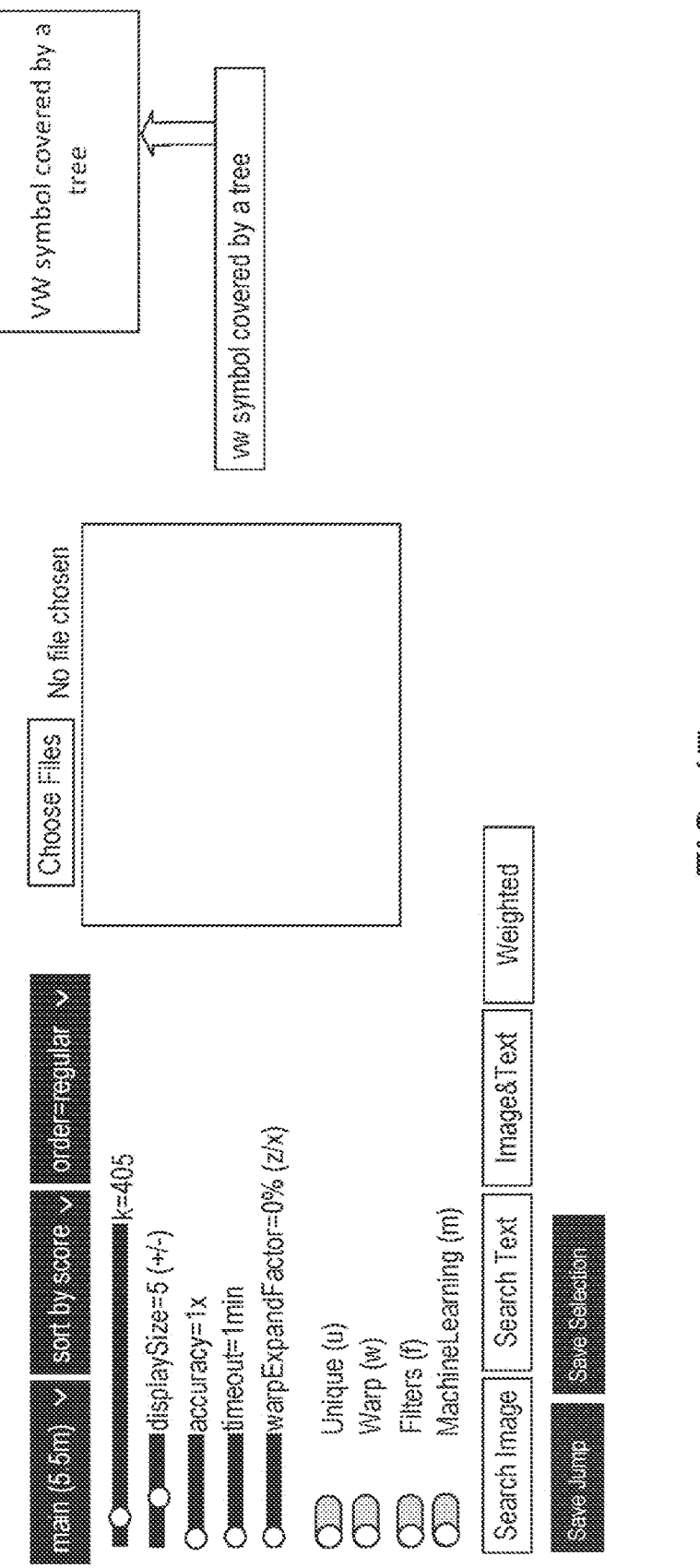
Figure 18:
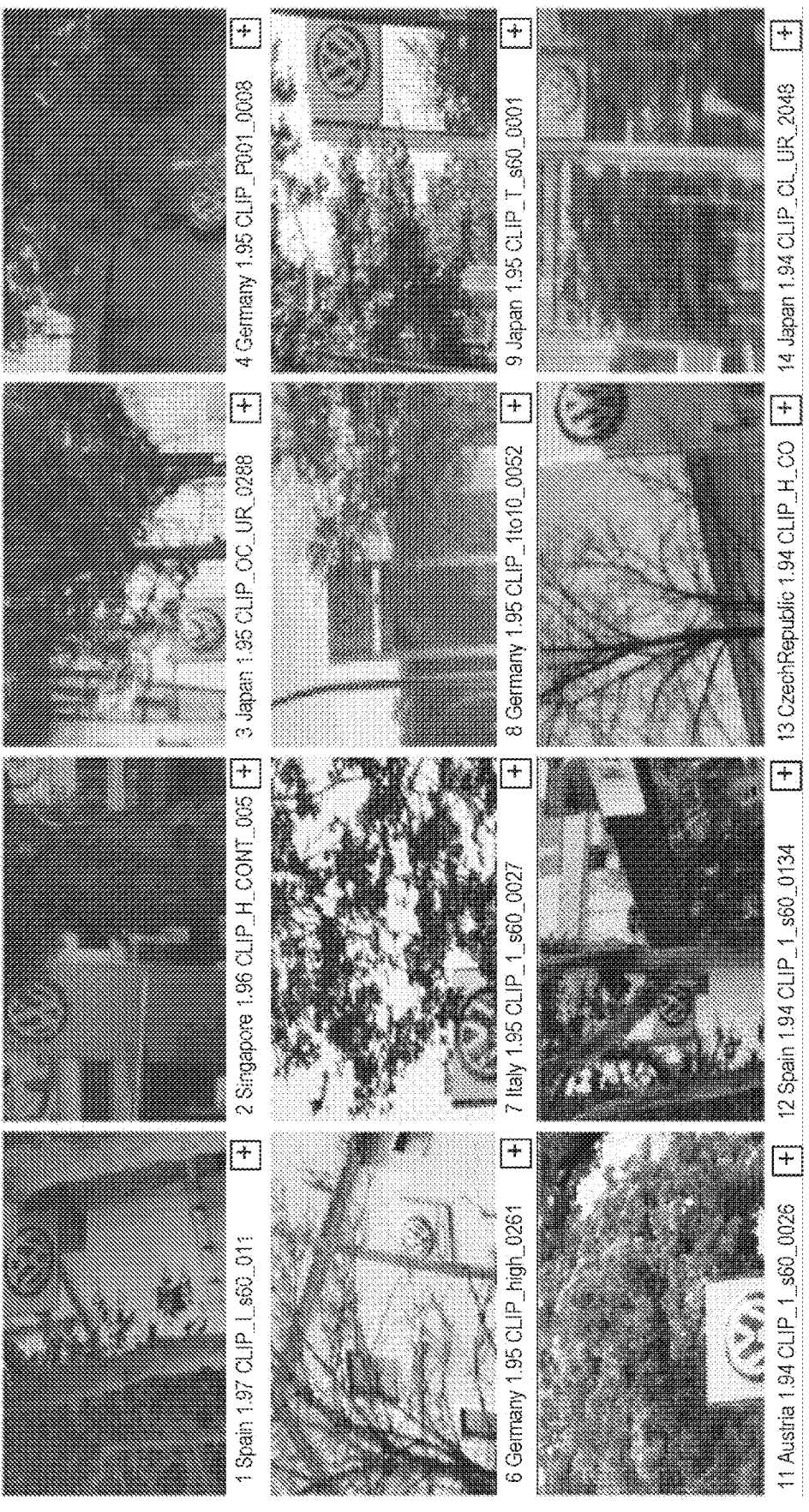
Figure 19:
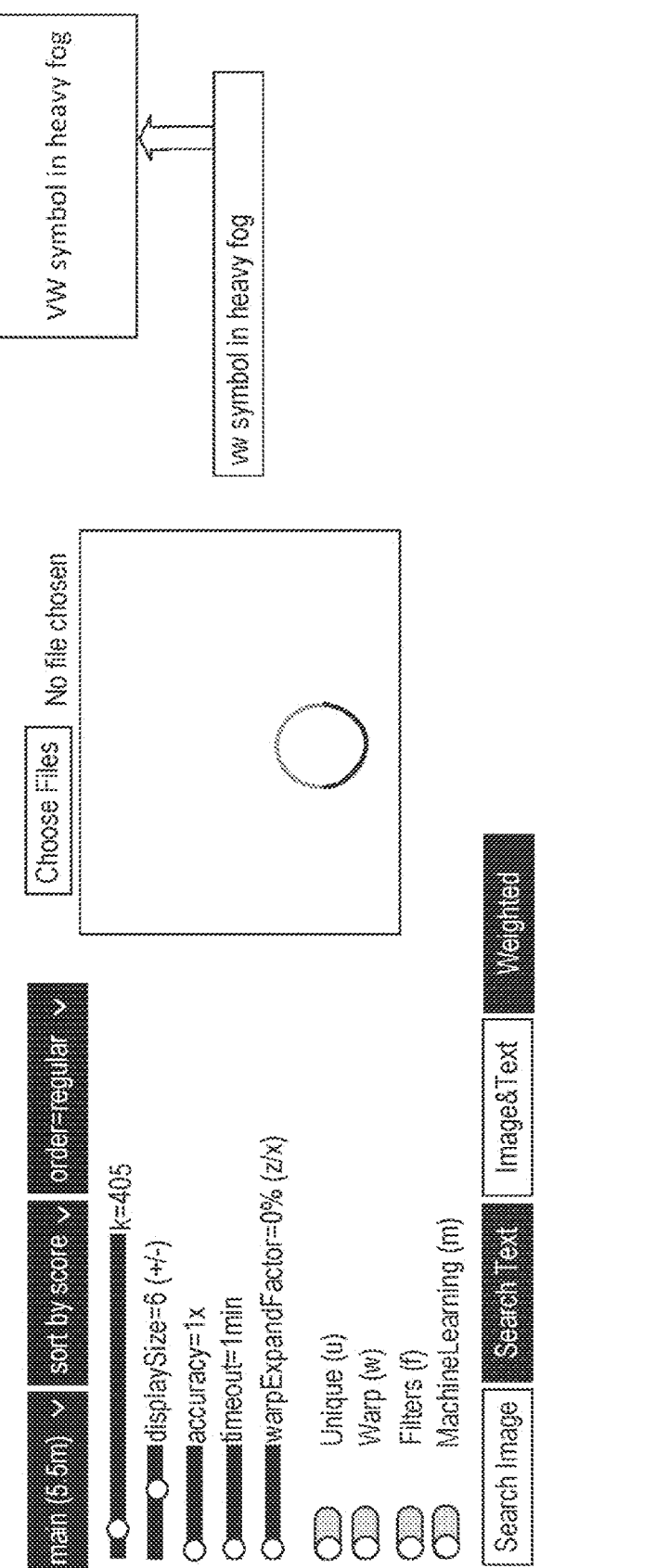
Figure 20:
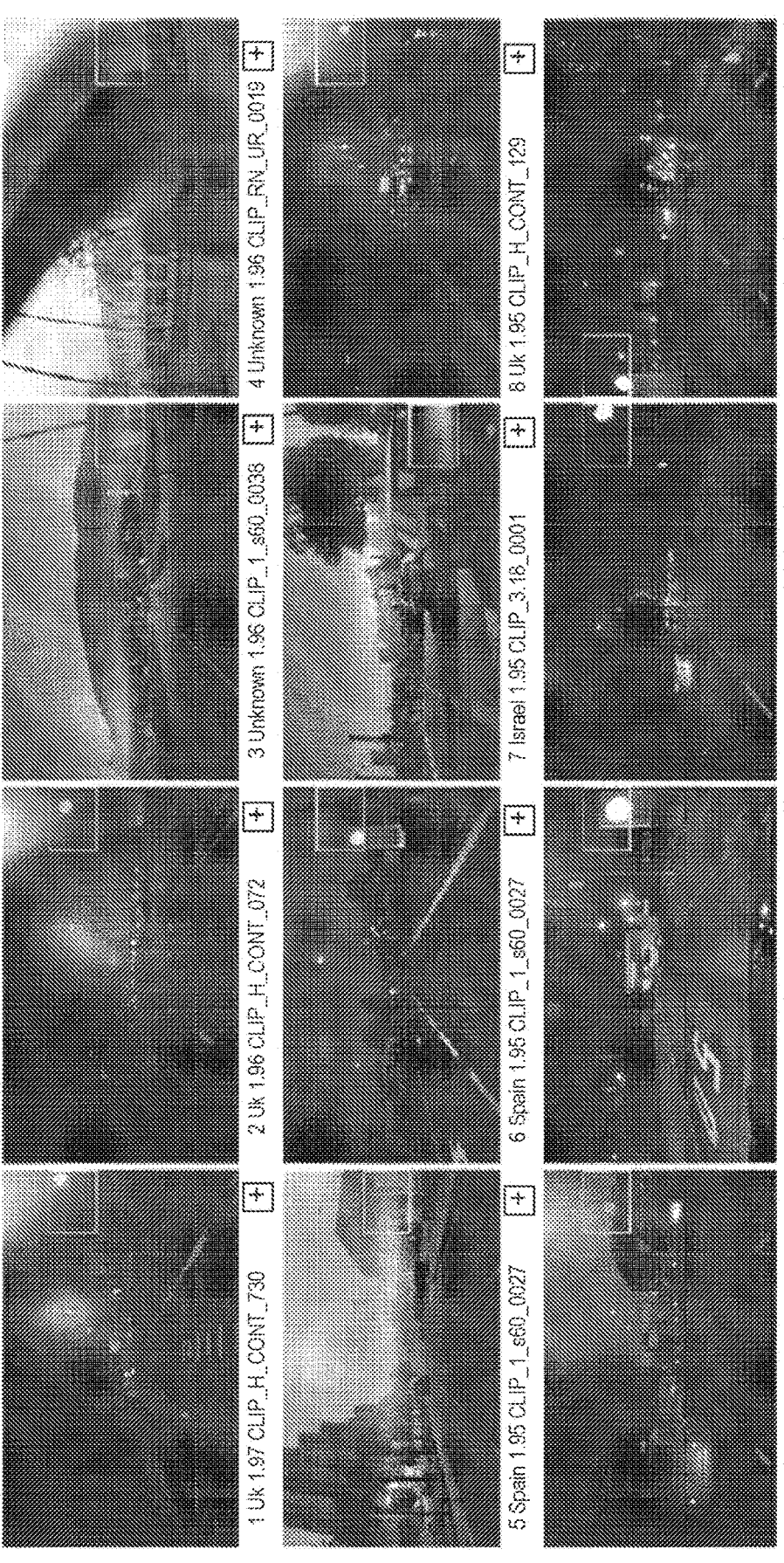

FIGS. 15, 16, 17, 18, 19, and 20 represent three examples of searches wherein the one or more scenario descriptors may convey a relationship between two or more objects that may have similar results. In the examples, additional user input may be provided to identify relevant vs. irrelevant results to refine the association between the one or more scenario descriptors and the images in the database and thus refine subsequent search results in response to the one or more scenario descriptors. As shown in FIG. 15, the scenario descriptor "vw symbol in snow" may be used to initiate a search. FIG. 16 displays the results for the search, including various representations of the VW symbol in snowy road conditions. As shown in FIG. 17, the scenario descriptor "vw symbol covered by a tree" may be used to initiate a search. FIG. 18 displays the results for the search, which include representations of the VW symbol in association with nearby trees. As shown in FIG. 19, the scenario descriptor "vw symbol in heavy fog" may be used to initiate a search. FIG. 20 displays the results for the search, which include representations of the VW symbol in foggy road environments. For any of these searches, refined search results may be provided based on user input identifying certain returned images as relevant and/or other returned images as less relevant or irrelevant.

Returning to FIG. 12 as shown in step 1220, the one or more processors may be configured to identify in a database an initial plurality of images based on the first user input. It is to be appreciated that at least some of the initial plurality of images identified in the database and displayed to the user may represent the two or more objects in the conveyed relationship. Search results shown in FIGS. 14, 16, 18, and 20 provide examples of displayed search results that convey a relationship between two or more objects specified or guided by a search query. In embodiments, the at least one of the initial plurality of images identified by a second user input may represent the two or more objects in the conveyed relationship. The second user input identifying relevant and/or unwanted or irrelevant results may allow for refinement of the search results in subsequent searches.

As described above, the disclosed search engine may provide the functionality of a CLIP model or a CLIP model emulator. Databases accessible to the search engine may include a plurality of stored images each associated with at least one image descriptor. The image descriptor may include a text-image pair generated by a CLIP model. It is to be appreciated that a search algorithm may use the at least one image descriptor and the text-image pair to search the database and to score the results.

Returning to FIG. 12, at step 1230, the one or more processors may display the initial plurality of images to a user. In response to the displayed images, at step 1240, the one or more processors may receive a second user input wherein the second user input may identify at least one of the initial plurality of images. The second user input may allow a user to select relevant and/or irrelevant results. The second user input may include selection of at least one of the initial plurality of images that the user deems as most representative of the one or more scenario descriptions the user envisioned for the search query. In the example of the search "bike on car", a user may select one or more images that represent accurate results showing a bike, a car and the requested relationship between the two objects. In some embodiments, the second user input may identify at least one of the initial plurality images that is not representative of the one or more scenario descriptors. For example, the selection of the at least one of the initial plurality of images that may not be representative of the one or more scenario descriptors may be indicative of unwanted or irrelevant results. In the example of the search "bike on car", a user may select one or more images that represent less accurate results showing a bike and a car, but lacking a representation of the requested relationship between the two objects. Such images may be excluded from a later returned refined set of results. Additionally, similar types of images that also lack the requested relation between the bike and the car may also be excluded from the refined plurality of images included in the refined search results.

It should be noted that in some cases the refined search results may include one or more images also found in a set of earlier returned search results. In other cases, the refined search results and the earlier returned search results may be mutually exclusive such that no images returned in the refined search results are also found in earlier returned search results.

At step 1250, the one or more processors may identify a refined plurality of images in the database based on the one or more scenario descriptors in combination with the second user input. The refined plurality of images may include one or more images not included in the initial plurality of images. By way of an example, based on the second user input, the plurality of images may be refined and the search results may contain one or more additional new images that are representative of the combination of the one or more scenario descriptors in combination with the second user input. At step 1260, the one or more processors may display the refined plurality of images to the user.

In some cases, even further user input may be provided to further improve search results. For example, the at least one processor may be configured to receive a third user input, wherein the third user input may identify at least one of the refined plurality of images. The search engine may identify a further refined plurality of images in the database based on the one or more scenario descriptors in combination with the second user input and the third user input and may display the further refined plurality of images to the user. It is to be appreciated that a plurality of iterations of the described process may assist a user in generating a desired set of images.

The sections below provide additional details relative to the operation of the described search engine tool. As a database preparation step, a plurality of images may be prepared, in one example, by segmenting the images into regions and sub-regions. For example, an image may be divided into a grid, such as an N×M grid. A signature generator (e.g., a model trained to output a unique feature vector based on an image input) may calculate and assign signatures (e.g., feature vectors) to each tile grid. In some cases, an image may be divided according to multiple grids of different grid tile size. For example, an image may be first divided into an 8×6 array of grid tiles. The same image may also be divided into a 4×3 array of grid tiles, which will be larger than the tiles included in the 8×6 array. Signatures may be calculated for each of the grid tiles, in each of the different arrays applied to a particular image, and the signatures may be stored in a database. It should be appreciated that differently sized grid tiles may offer the advantage of signatures associated with varying levels of complexity or object interaction represented in an image. For example, a small grid tile may be contained fully (or nearly fully) within a region of an image including a representation of a vehicle. A larger grid, however, may correspond to a region of the image that includes representations of both the vehicle and a bicycle secured to a rack on the vehicle. The signature associated with the smaller tile may represent aspects of the vehicle, while the signature associated with the larger tile may represent a more complex interaction between the vehicle, the bicycle, and the rack that joins the bicycle to the vehicle.

The CLIP model functionality described above can be used to provide another layer of access to the images stored in the database. For example, the CLIP model connects images with text. Such connections can be generated for an entire image (e.g., an image that shows a car with a bike on a rack driving on a beach) or may be generated relative to sub-regions of an image (e.g., a sub-region that includes only a representation of the car; a sub-region that includes a representation of the car and the beach; a sub-region that includes the bike; a sub-region that shows the interaction between the bike, rack, and car; and so on). Text representative of each of the sub-regions may be stored in the image database.

Recall of images may be based on image region signatures, text corresponding to image segments, or a combination of both. This can be done using embeddings. An embedding is a relatively low-dimensional space into which high-dimensional vectors may be translated. An embedding may capture some of the semantics of an input by placing semantically similar inputs close together in the embedding space.

In addition to the grid approach described above, embeddings may also be generated based on other approaches. For example, rather than (or in addition to) dividing images into grids and creating embeddings for each of the grid tiles, embeddings may be generated for identified objects of interest represented in an image. In an example image in which a vehicle and a pedestrian are represented along an open, rural road, embeddings may be generated and stored for any desired grid tile size. In some cases, the grid tile sizes may be made smaller in a region where objects of interest are located, and multiple grid sizes may be applied to regions including objects of interest. This may preserve computational resources and memory (e.g., by avoiding generation and storage of many embeddings relative to areas of an image with little feature variation or few objects of interest) while resources may be directed toward areas of an image rich in information (e.g., multiple objects of interest with varying degrees of interaction between them, etc.).

Together with, or as an alternative to the grid approach outlined above, embeddings may be generated relative to objects of interest detected in an image. For example, in this example, an image segmentation technique (e.g., algorithmic image analysis, trained model, etc.) may be used to identify the pedestrian and the vehicle represented in the image. Rather than (or in addition to) generating embeddings for a uniform wheat field surrounding the pedestrian and vehicle, in some cases, embeddings may be generated representative only of the vehicle and the pedestrian (perhaps each alone and/or together), and this embeddings information can be stored in the embeddings database. This technique may provide an opportunity for the generation of focused embeddings representative of particular objects of interest represented in an image.

Further techniques may also be used to avoid duplicates in an embeddings database or to reduce embeddings generated and stored relative to uniform or low feature backgrounds in an image. For example, embeddings may be generated only for images collected from a moving camera (e.g., images acquired from harvesting vehicle camera during motion of the harvesting vehicle). Selected frames in a time captured series may be omitted from the embeddings database. For example, from a harvesting vehicle that captures images frames at 9 Hz, a suitable database with a desired level of image variation may be generated by saving embeddings once every 10 captured frames (or at any other suitable time interval). Such an approach may avoid saving a huge number of embeddings for images having relatively little variation between them. Further, similar embeddings generated for a single image frame (e.g., clip) may be omitted from the database. This can significantly reduce the size of an embeddings database without losing valuable information.

Thus, one or more trained models (Resnet, CLIP, TSR Signature, etc.) may be used to generate signatures and/or text corresponding to images or image segments, and this information may be stored in an embeddings database. Identification of candidate images based on user input may rely upon the embeddings information. Such a technique may offer an approach of quick, efficient identification of select images (e.g., 10, 20, 100, etc.) relevant to received user input even when the candidate images are included in a database of millions or billions of images. Location of candidate images in an embeddings database may rely upon any suitable technique, such as K-Nearest Neighbor (KNN), local sensitivity hashing (LSH), for example.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for searching an image database, the system comprising:
   at least one processor comprising circuitry and a memory, wherein the memory includes instructions that when executed by the circuitry cause the at least one processor to:
   identify an initial plurality of images based on one or more descriptors;
   display the initial plurality of images;
   receive a selection of at least one image of the initial plurality of images;
   identify a refined plurality of images based on the one or more descriptors and the received selection;
   display the refined plurality of images;
   receive a selection of at least one refined image of the refined plurality of images;
   identify a further refined plurality of images based on the one or more descriptors, the received selection of at least one image of the initial plurality of images, and the received selection of at least one refined image of the refined plurality of images; and
   display the further refined plurality of images to the user.

2. The system of claim 1, wherein the one or more descriptors include one or more text strings.

3. The system of claim 1, wherein the one or more descriptors convey a relationship between two or more objects.

4. The system of claim 3, wherein at least some of the initial plurality of images displayed to the user represent the two or more objects in the conveyed relationship.

5. The system of claim 3, wherein the at least one image of the initial plurality of images represents the two or more objects in the conveyed relationship.

6. The system of claim 1, wherein the initial plurality of images and the refined plurality of images are identified in a database including images indexed using a CLIP model.

7. The system of claim 1, wherein the initial plurality of images and the refined plurality of images are identified in a database including a plurality of stored images each associated with at least one image descriptor.

8. The system of claim 7, wherein the image descriptor includes a text-image pair generated by a CLIP model.

9. The system of claim 1, wherein the refined plurality of images includes one or more images that are not included in the initial plurality of images.

10. The system of claim 9, wherein there are no common images between the initial plurality of images and the refined plurality of images.

11. The system of claim 9, wherein the refined plurality of images includes at least one image in common with the initial plurality of images.

12. The system of claim 1, wherein the received selection of at least one image of the initial plurality of images is representative of the one or more descriptions.

13. The system of claim 1, wherein the received selection of at least one image of the initial plurality of images is not representative of the one or more descriptors.

14. The system of claim 1, wherein the refined plurality of images includes the at least one image of the initial plurality of images.

15. The system of claim 1, wherein the refined set of images excludes the at least one image of the initial plurality of images.

16. The system of claim 1, wherein the one or more descriptors and the received selection of at least one image of the initial plurality of images are received via a user interface shown on a display.

17. The system of claim 16, wherein the user interface includes a plurality of control elements to control aspects of how the initial plurality of images and the refined plurality of images are shown on the display.

18. The system of claim 17, wherein the plurality of control elements includes a display warp toggle.

19. The system of claim 16, wherein the user interface includes a control element to specify a maximum number of images to include in at least one of the initial plurality of images or the refined plurality of images.

20. The system of claim 16, wherein the user interface includes a weighted search element to cause deemphasis in the refined plurality of images of a first type of image and to cause emphasis in the refined plurality of images of a second type of image.

21. A method for searching an image database, the method comprising:

identifying an initial plurality of images based on one or more descriptors;

displaying the initial plurality of images;

receiving a selection of at least one image of the initial plurality of images;

identifying a refined plurality of images in the database based on the one or more descriptors and the received selection;

displaying the refined plurality of images;

receiving a selection of at least one refined image of the refined plurality of images;

identifying a further refined plurality of images based on the one or more descriptors, the received selection of at least one image of the initial plurality of images, and the received selection of at least one refined image of the refined plurality of images; and displaying the further refined plurality of images to the user.

22. The method of claim 21, wherein the one or more descriptors include one or more text strings.

23. The method of claim 21, wherein the one or more descriptors convey a relationship between two or more objects.

24. The method of claim 23, wherein at least some of the initial plurality of images represent the two or more objects in the conveyed relationship.

25. The method of claim 23, wherein the at least one image of the initial plurality of images represents the two or more objects in the conveyed relationship.

26. The method of claim 21, wherein the initial plurality of images and the refined plurality of images are identified in a database including images indexed using a CLIP model.

27. A non-transitory computer-readable medium storing instructions executable by at least one processor to perform a method for searching an image database, the method comprising:

identifying an initial plurality of images based on one or more descriptors;

displaying the initial plurality of images;

receiving a selection of at least one image of the initial plurality of images;

identifying a refined plurality of images in the database based on the one or more descriptors and the received selection;

displaying the refined plurality of images;

receiving a selection of at least one refined image of the refined plurality of images;

identifying a further refined plurality of images based on the one or more descriptors, the received selection of at least one image of the initial plurality of images, and the received selection of at least one refined image of the refined plurality of images; and displaying the further refined plurality of images to the user.

28. The non-transitory computer-readable medium of claim 27, wherein the one or more descriptors include one or more text strings.

29. The non-transitory computer-readable medium of claim 27, wherein the initial plurality of images and the refined plurality of images are identified in a database including images indexed using a CLIP model.

*  *  *  *  *